United States Patent Office 3,660,321
Patented May 2, 1972

3,660,321
SHAPED ARTICLES COMPRISING SELF-EX-
TINGUISHING COMPOSITIONS OF PLASTICS
AND MICROCAPSULES CONTAINING FLAME-
ABATING COMPOUNDS AND PROCESS FOR
PRODUCING THE SAME
Hans Eberhard Praetzel, Schubertstr. 3, Bensberg-Franken-
forst, Germany, and Herbert Jenkner, Deutz-Kolker
Str. 66, Cologne-Deutz, Germany
No Drawing. Filed Sept. 22, 1969, Ser. No. 860,010
Claims priority, application Germany, Sept. 30, 1968,
P 17 94 271.1
Int. Cl. C08f 7/04; C09k 3/28
U.S. Cl. 260—2.5 FP                                16 Claims

ABSTRACT OF THE DISCLOSURE

Shaped articles of self-extinguishing compositions are produced by mixing a combustible plastic with microcapsules having a diameter of 5 to 5000 microns and containing a flame-abating compound for the plastic and forming a shaped article from the mixture, the mixing and forming being conducted under conditions such that the microcapsules are neither physically nor thermally ruptured and the flame-abating compound is retained in the microcapsule.

In endeavors to reduce the flammability of combustible plastics and thus to widen the field of utilization thereof, success has been achieved by adding to the plastic, as flameproofing components, organic compounds containing halogen and/or phosphorus, such as chloroparaffins, tetrabromoethane, polychlorodiphenyl, pentabromodiphenyl ether, tris-(2-chloroethyl)-phosphate, or tris-(2,3-dibromopropyl)-phosphate. Insofar as these flame abating compounds are of low molecular weight and are only mechanically admixed with the plastic, they present the drawback of migrating from the plastic after a period of time. This migration reduces the content of flameproofing component in the plastic with the result that it becomes flammable again.

Another means of rendering plastics flame retardant comprises adding to the plastic-forming mixtures, organic halogen- an/or phosphorus compounds, capable of combining with the plastic, in such a manner that these compounds are integrated in the macromolecules of the plastic. For this purpose tetrabromobisphenols, hexachloro-endomethylene tetrahydrophthalic anhydride (HET- acid anhydride), tetrabromophthalic anhydride, as well as phosphates or phosphonates containing free hydroxyl groups can be employed. By the addition of these compounds, however, the prescribed formula and in most cases also the method for preparing the plastic is changed, which leads to technical manufacturing difficulties and to changes in the physical properties of the plastic. An additional disadvantage is that many organic phosphorus compounds exert a softening effect upon the plastic whereas the substitution of phthalic anhydride by HET acid anhydride in the preparation of flameproof unsaturated polyester plastics causes embrittlement. Moreover, in the preparation of such flameproof plastics other catalysts, initiators, accelerators, or stabilizers must often be employed, in order to avoid undesirable side reactions. When, tetrabromophthalic anhydride such as that obtained from phthalic anhydride and bromine in the presence of oleum is employed for preparing unsaturated polyesters, it is necessary to add to the polyester reaction mixture also a sodium salt of an inorganic or organic acid, so as to assure satisfactory condensation.

Therefore possibilities were explored whereby the above disadvantages can be avoided without giving up the proven efficiency of flameproofing components that have been employed in industry for a long time.

A method was discovered for making flameproof, self-extinguishing compositions that are useful as molding materials, shaped elements, lacquers, films, foils, paints and coatings which comprise or consist essentially of flammable plastic, by admixing flame-abating compounds. In this method, the flame-abating compounds are contained in microcapsules, 5 to 5,000µ in diameter.

The invention relates furthermore to the employment of flame-abating compounds enclosed in microcapsules and servings as flameproofing components in plastics produced or shaped at maximum temperatures and/or under a maximum compression stress, both below the point where the thermal and/or mechanical strength of the microcapsules reaches its maximum limit.

The manufacture of the microcapsules to be employed according to the invention and filled with flame-abating components, can take place by known methods for the production of capsules, 5 to 5000µ in diameter, filled with gases, liquids, or solid materials. Such a method is described, for instance, in U.S. Pat. No. 3,159,585. In this known method, the materials to be enclosed are enveloped on all sides with a film of the coating material which thus constitutes the microcapsule. Well tested coating materials for the microcapsules, to be employed according to the invention are, e.g., derivatives of dextrin or gelatin, polyesters, homopolymers and mixed polymers from unsaturated hydrocarbons and derivatives thereof, such as e.g., styrene, mixed polymers of acrylic amide and tertiary butylacrylic amide or of styrene and divinyl benzene. Natural resins, such as gum arabic or mixtures of gum arabic and gelatin, are also suitable. Other materials can also be employed as coating materials if they are suitable for the formation of microcapsules. As examples for the production of the microcapsules as prescribed by the invention, the following passage specifies the production method for microcapsules consisting of polyesters and filled with 1,1,2,2-tetrabromoethane, and furthermore for microcapsules consisting of carboxylated dextrin and filled with tris-(2,3-dibromopropyl) phosphate.

A solution of 15.5 pts. b. wt. of terephthaloyl chloride in 250 pts. b. wt. of 1,1,2,2-tetrabromoethane was emulsified at 25° C., while being intensely stirred, in 200 pts. b. wt. of water wherein 4 pts. b. wt. of polyvinyl alcohol and 0.1 pts. b. wt. of tetrasodium pyrophosphate were dissolved. To this emulsion, a solution of 2,2-bis-(4-hydroxyphenyl)-propane and 6.2 pts. b. wt. of sodium hydroxide in 100 pts. b. wt. of water was slowly added. When the bisphenol solution was being added, a polycondensation took place at the boundary surface of the dispersed phase, in which process microcapsules were produced which contained the 1,1,2,2-tetrabromoethane as liquid phase.

500 pts. b. wt. of cornstarch were suspended in 700 pts. b. wt. of water at a temperature of 30° C. Within two hours an aqueous solution of sodium hypochlorite, containing 25% active chlorine was introduced into the aforementioned solution, the pH value of the suspension being maintained at 7.5±0.1 by continual addition of small amounts of aqueous hydrochloric acid. After the addition of the sodium hypochlorite solution, the suspension was kept for five hours at the pH value of 7.5±0.1. Subsequently, the excess of chlorine was removed by addition of 0.25 pts. b. wt. of sodium hydrogen sulfite, dissolved in as little water as possible. By addition of concentrated hydrochloric acid the pH value of the reaction mixture was then adjusted to 2.2 to 2.5 and this reaction mixture was then stirred for two hours. Then the mixture was filtered. The carboxylated starch which remained as residue was washed with agents free of acids and salts, and dried at temperatures of 50 to 80° C. to a remaining moisture content of about 10%.

The carboxylated starch thus produced was transformed into carboxylated dextrin by spraying with aqueous hydrochloric acid at a temperature of 190° C. within 15 minutes. This carboxylated dextrin was soluble up to above 90% in water at 22° C.

150 pts. b. wt. of the earboxylated dextrin thus obtained were dissolved within 20 minutes in 300 pts. b. wt. of water at 75° C. and cooled to 22–25° C., 300 pts. b. wt. of tris-(2,3-dibromopropyl)-phosphate were emulsified, while being stirred, in this solution. The emulsion was dried by spraying at a temperature of 80 to 85° C. The resulting dry product consisting of microcapsules, about $20\mu$ in diameter, contained 40% b. wt. tris-(2,3-dibromopropyl)-phosphate. The same method permits the enclosing in microcapsules of chloroparaffins with up to 70% b. wt. chlorine, as well as of dibromoethane, 1,1,2,2-tetrabromoethane, pentabromodiphenyl ether, or tris-(chloroethyl)-phosphate. Such microcapsules contain preferably 90% b. wt. chloroparaffin, 85% b. wt. of dibromoethane, 90% b. wt. 1,1,2,2-tetrabromoethane, 80% b. wt. pentabromodiphenyl either, or 50% b. wt. tris-(chloroethyl)-phosphate. Other flame-abating compounds may also be enclosed in microcapsules if the latter are produced from, and consist of, materials that do not react with the enclosed flame-abating compounds. The microcapsules should insofar as possible be inert with respect to the plastic material with which they are processed. In some cases, however, it may be advantageous if the material of which the microcapsule consists, reacts superficially with the plastic material or the constituents thereof. Such reaction on the surface, however, must never cause the destruction of the microcapsule. Only in the case of a destruction-free reaction of the plastic material with the surface of the microcapsule, a reinforcement of the capsule wall is brought about and the microcapsule is firmly embedded in the structure of the macromolecules of the plastic material.

The microcapsules filled with the flame-abating compounds are admixed to the formative mixtures for the plastics or to the plastics themselves and these mixtures are further processed in conventional processes for such plastics whereby, however, now flameproof or self-extinguishing compositions result.

Thus it is possible to add, in styrene, the microcapsules filled with flame-abating compounds to solutions of unsaturated polyesters prepared e.g., from phthalic anhydride or adipic anhydride or the anhydride of an unsaturated polycarboxylic acid, such as maleic anhydride, and from a polyhydric alcohol such as ethylene glycol, whereafter the mixture obtained is further processed as cast resin or lacquer solution by means of the customary method. The microcapsules filled with flame-abating compounds may also be added to the initial mixtures for the preparation of polyepoxides, which mixtures consist e.g. of bisphenol-bis-(glycidyl ether), before the polyepoxides harden. The mixtures thus produced in the form of casting resin or lacquer solution are then hardened and shaped in a known manner after addition of amine, e.g. triethylene tetramine, metaphenylene diamine, or of anhydrides, e.g. hexahydrophthalic anhydride or maleopimaric anhydride. For the production of shaped elements, possibly made by foaming, of polyurethanes, the microcapsules filled with flame-abating compounds are added to the polyurethane mixtures for making the plastic material. These mixtures for making the plastic material consist, as known, mainly of polyesters or polyethers with free hydroxyl groups and polyvalent isocyanates, such as e.g. toluene diisocyanate, hexamethylene diisocyanate or polymethylene polyphenyl isocyanate, to which furthermore customary catalysts, stabilizers and possibly solvents and/or expanding agents may be added. After admixture of the microcapsules filled with flame-abating compounds, these formative mixtures are hardened in a known manner while being shaped, optionally with foaming.

For the preparation of flameproof polystyrene foams, the microcapsules are applied to the surface of already premanufactured inflatable granulated polystyrene material or granulated material consisting of a mixed polymer of styrene with addition of 2% b. wt. divinyl benzene, in one layer. For this purpose, the microcapsules are mixed as suspension in readily volatile solvents, such as e.g. pentane, petroleum ether (B.P. 40 to 60° C.), water or methanol, with the granulated polystyrene material, whereafter the dispersing agent is evaporated. It is advantageous to add to the suspension also a customary binder, such as e.g. polyisobutylene, polyvinyl alcohol, polyvinyl ether, in order to reinforce the adherence of the microcapsules to the surface of the granulated polystyrene materials. The granulated polystyrene material coated with a microcapsule layer is subsequently shaped as usual by foaming.

The microcapsules filled with the flame-abating compounds are employed in such quantities that the plastic or the formative mixtures therefor contain up to 25% b. wt. chlorine, up to 12% b. wt. bromine and/or up to 4% b. wt. phosphorus.

Surprisingly, no larger quantity of flameproofing component is required than in the case of employment of flameproofing components not enclosed in capsules. If in special cases it should be technically advantageous, it is possible to use, besides the flameproofing components enclosed in microcapsules, also non-enclosed flameproofing components, e.g. antimony trioxide, arsenic trioxide, bismuth trioxide and/or flameproofing components reacting with the formative compounds of the plastic. The proportions of the flame-abating compounds in the microcapsules and the quantity of the microcapsules to be employed should be adjusted in such a way that the plastics contain e.g. about 55% b. wt. bromine and 0.5% to 7% b. wt. phosphorus.

When the plastic consists of polyester styrene mixtures, it is advantageous to employ microcapsules containing tris-(dibromopropyl)-phosphate and triphenyl phosphate. The same effect can be produced with microcapsules which, in addition to pentabromodiphenyl ether, also contain tricresyl phosphate or red phosphorus. It is, however, also possible to employ microcapsules which contain pentabromodiphenyl ether, only if the plastic contains a phosphorus compound which can be integrated with the plastic portion, such as e.g. triallyl phosphate. Generally mixtures of styrene and unsaturated polyesters should contain a total of 5% b. wt. bromine and 0.5 to 0.7% b. wt. phosphorus. Chloroparaffins enclosed in microcapsules can also be employed for flameproofing mixtures of styrene and unsaturated polyesters, namely, in such quantities that these mixtures contain 25% b. wt. chlorine. When an organic phosphorus compound is also employed in such quantity that in the final product e.g. 0.5% b. wt. phosphorus is present, the quantity of the chloroparaffins can be reduced to such a degree that the final product contains about 15% b. wt. chlorine.

For polyepoxides or polyurethanes, all flame-abating compounds, except triallyl phosphate, can be employed which were listed above for the polyester-styrene mixtures. In the case of epoxides, it is also possible to use red phosphorus not enclosed in microcapsules. In the case of polyepoxides and polyurethanes, amounts of 5% b. wt. bromine and 2% b. wt. phosphorus produce generally complete flame protection.

Plastics can contain dibromoethane or tetrabromoethane enclosed in microcapsules as flameproofing component in such quantities that about 2% b. wt. bromine is present in the mixture. This amount of bromine can be reduced to about 1% b. wt. if together with the dibromo- or tetrabromoethane small amounts of organic peroxides, e.g. dicumyl peroxide, tertiary butyl perbenzoate, ferrocene or heavy metal acetyl acetonates are enclosed in the microcapsules as synergists. These synergists, however, may also be enclosed in separate microcapsules which are employed in the mixture together with the microcapsules that contain the flame-abating component. It is likewise possible to insert, when several flameproofing components are employed, each one separately enclosed in microcapsules, and to introduce a mixture of these microcapsules into the plastic.

While any haloparaffin can be employed in the microcapsules of the present invention the preferred haloparaffins are those of the formula:

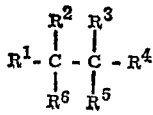

wherein $R^1$ through $R^6$ is each independently selected from the group consisting of H, Cl, Br, $CH_3$ and $C_2H_5$ with the proviso that at least two of the R's are halogens selected from the groups consisting of Cl and Br, and with the second proviso that the compound has a normal boiling point (i.e. at 760 mm. Hg) of over 100° C. and preferably 120 to 400° C. Examples of suitable haloparaffins include among others 1,2 - dibromoethane, 1,1,1,2-tetrachloroethane, 1,2,3-dibromopropane and most preferably 1,1,2,2-tetrabromoethane.

The combustible plastics useful in the present invention can be employed in their pure form or filled with conventional fillers such as quartz, silica, carbon black in amounts up to 80% or more by weight.

After addition of the microcapsules filled with flame-abating compounds, these plastics must not be heated to a temperature at which the microcapsules are destroyed. Thus, the formative mixtures should insofar as possible not be heated to temperatures above 150° C. Furthermore, the mixtures containing the microcapsules must not be produced or shaped under a mechanical pressure effect which exceeds the resistance of the microcapsules to compression stress. Thus, the forming mixtures should, insofar as possible not be subjected to a pressure exceeding 3 kg./cm.$^2$.

The method of the invention includes the possibility of employing as flame-abating components gaseous or readily evaporable components. Likewise, according to the method of the invention, it is possible to employ flame-abating compounds which, unless enclosed in microcapsules, cannot be employed for this purpose, either because they have a strong tendency to migrate or because they change in an undersirable manner the mechanical and physical properties of the plastic. The flameproofing components prescribed by the invention, when enclosed in microcapsules, exhibit no tendency to migrate from the plastic materials. Moreover, the flameproofing components prescribed by the invention, when enclosed in microcapsules, produce no undesirable discolorations or practically no changes in the mechanical and physical properties of the plastics. Furthermore, they do not cause corrosions in processing machines consisting of steel or other metals, as they readily do occur in the processing of plastics that contain flameproofing components not enclosed in microcapsules.

In the following, the method of the invention is explained in greater detail by means of examples wherein all parts and percentages are by weight.

The examination of the behavior with respect to flammability took place according to ASTM regulations 1692 and 635.

According to ASTM regulation 1692, test bars, 15.25 cm. in length, were sawed from the shaped elements to be tested, which bars had a square base with an edge length of 1.27 cm. As support for the test bars a wire netting with 2.5 mesh per cm. was employed during the test. This netting was folded to form a groove with an aperture angle of 90°. Into this groove which was set up free from draft at an angle of inclination of 30°, the test bar was inserted in such a way that it projected by 1.27 cm. from the lower end of the groove. A Bunsen burner was held for 10 seconds under the end of the test bar which projected from the groove, so that the flame of the Bunsen burner, made non-luminous and 5 cm. in length, just touched the test bar.

According to ASTM regulation 635, test bars with the dimension 13 x 6.5 x 127 mm. were cut from the shaped elements to be tested. These test bars were clamped horizontally in a support clamp in such a way that the narrow side of the largest lateral surface formed with the horizontal line an angle of 45°. Below this test piece, at a distance of 9.6 mm., a Bunsen burner wire net, about 10 cm. in size and 116 mm. in length, with 58 mesh per cm., also held by a clamp, was fastened. For the flammability test, the free end of the test bar was struck by the flame, made non-luminous, by a Bunsen burner for 30 seconds, and the time within which the test piece ceased burning after removal of the flame was measured.

EXAMPLE 1.—FLAMEPROOF POLYSTYRENE

In a mixture of 20 pts. of pentane as a flowing agent 0.5 pts. of polyisobutylene and 10 pts. of microcapsules of carboxylated dextrin, containing 40% tris-(2,3-dibromopropyl) phosphate, 100 pts. of a polystyrene suspension polymer were stirred up and from the mixture the pentane was evaporated at room temperature. The microcapsules had a diameter of about $20\mu$. Each single bead of the blowing-agent-containing polystyrene thus produced was enveloped by a thin polyisobutylene layer in which the flameproofing agent enclosed in the microcapsule was embedded. The polystyrene beads were expanded by heating in boiling water to approximately 30 times their volume. This prefoamed polystyrene was filled into molds and molded to a shaped element by heating for a short period with steam. For removal of the blowing agent residues, the shaped element was stored for about 24 hours at 40° C. In the flammability test according to the ASTM test 1692 the flame went out within 4 seconds.

EXAMPLE 2.—FLAMEPROOF POLYSTYRENE

When for the process of Example 1, 3.4 pts. of microcapsules from carboxylated dextrin, containing 85% 1,2-dibromoethane, were employed instead of the tris-(2,3-dibromopropyl)-phosphate, the extinglishing period of the flameproof polystyrene produced measured according to ASTM 1692, was 3 seconds.

EXAMPLE 3.—FLAMEPROOF POLYSTYRENE

When for the process of Example 1, three pts, of microcapsules from carboxylated dextrin, containing 90% 1,1,2,2-tetrabromoethane were employed instead of the tris-(2,3-dibromopropyl)-phosphate enclosed in microcapsules, the extinguishing period measured according to ASTM 1692 was 2 seconds.

EXAMPLE 4.—FLAMEPROOF POLYURETHANE

A mixture of:

27.75 pts. of a polyether on a sorbitol and propylene oxide base —OH number 425:
0.45 pt. of poly-(siloxane glycolester);
0.88 pt. of tin octoate;
2.50 pts. of trichlorofluoromethane;
17.5 pts. of microcapsules from carboxylated dextrin, containing 40% of tris-(2,3-dibromopropyl)-phosphate, was mixed, while being stirred, with 35.0 pts. of polymethylene polyphenyl isocyanate. While heating itself, the reaction mixture foamed up and hardened to a foam material having a density of 36 kg./cubic meter. In the testing of flammability according to the ASTM test 1692 the samples were extinguished within 5 seconds.

EXAMPLE 5.—FLAMEPROOF POLYEPOXIDE 100.0 pts. of 2,2-bis-(4-hydroxyphenyl)-propane glycidyl ether;
9.0 pts. of triethylene tetramine;

10.0 pts. of microcapsules carboxylated dextrin, containing 80% pentabromodiphenyl ether;
2.4 pts. of red phosphorus;
242.0 pts. of quartz powder, where mixed, while being stirred, and filled into a mold. While heating itself the mixture hardened to a shaped element which was then hardened again by tempering it for two hours at a temperature of 80. C.

In a flammability test according to ASTM 635 the samples were extinguished within 3 seconds.

EXAMPLE 6

The tendency to migrate of the flameproofing components in plastic materials and shaped elements can be tested only over very long periods of time, whereas the short-time measurement at increased temperature, which is also possible, often leads to wrong results. Therefore, the microcapsules themselves were tested for the tendency for flame protection compounds to migrate from the capsules.

For this purpose, microcapsules from carboxylated dextrin, containing 90% 1,1,2,2-tetrabromoethane, and also 1,1,2,2-tetrabromoethane not enclosed in capsules, each in a flat bowl, were subjected at a temperature of 50° C. to continuous fresh air supply. In this test the following decreases in weight were found:

| Duration of the experiment in hrs. | With microcapsules in percent | Without microcapsules in percent |
| --- | --- | --- |
| 4.5 | 2.23 | 1.12 |
| 12.0 | 2.79 | 6.12 |
| 20.5 | 2.79 | 10.62 |

The initial high decrease in weight of the test sample enclosed in microcapsules was caused by the fact that the capsule walls contain some residual moisture.

The same experiment, carried out at a temperature of 100° C., showed after a duration of the experiment of 20 hours, the following decreases in weight:

Percent
With microcapsules _____ 5.03
Without microcapsules _____ 98.92

Although the invention has been described in considerable detail with reference to certain preferred embodiments thereof, it will be understood that variations and modifications can be effected within the spirit and scope of the invention as described above and as defined in the appended claims.

What is claimed is:

1. A shaped article which comprises a self-extinguishing composition comprising:
   (A) foam polystyrene formed from polystyrene beads,
   (B) microcapsules having a diameter of 5 to 5000μ, and
   (C) a flame-abating compound in the microcapsules.

2. The shaped article of claim 1 wherein the walls of the microcapsules are of a material selected from the group consisting of a dextrin derivative, a gelatin derivative, a homopolymer of an unsaturated hydrocarbon, copolymers of unsaturated hydrocarbons, and mixtures of two or more of these materials.

3. The shaped article of claim 1 further comprising a flame-abating compound admixed with the polystyrene beads.

4. The shaped article of claim 1 further comprising a filler admixed with the polystyrene beads.

5. The shaped article of claim 1 wherein said flame-abating compound is a halogenated paraffin of the formula:

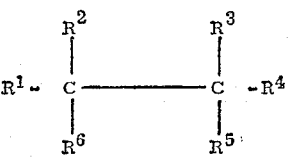

wherein $R^1$ through $R^6$ is each independently selected from the group consisting of H, Cl, Br, $CH_3$, and $C_2H_5$, with the first proviso that at least two of the R's are halogens selected from the group consisting of Cl and Br, and with the second proviso that the compound has a normal boiling point of over 100° C.

6. The shaped article of claim 5 wherein the walls of the said microcapsules are of carboxylated dextrin and said flame-abating compound is tris(2,3-dibromopropyl)-phosphate.

7. The shaped article of claim 1 wherein the walls of the microcapsules comprise the polymeric reaction product of terephthaloyl chloride and 2,2 - bis - (4-hydroxyphenyl)-propane.

8. The shaped article of claim 1 wherein said flame-abating compound is 1,1,2,2,-tetrabromoethane.

9. A process for producing a shaped article of a self-extinguishing composition comprising mixing polystyrene beads with microcapsules having a diameter of 5 to 5000μ and containing a flame-abating compound for the polystyrene to form a mixture and forming a shaped article from the mixture, and forming of the shaped article including forming the polystyrene bead mixture, wherein the mixing and forming are conducted under conditions such that the microcapsules are neither physically nor thermally ruptured and the flame-abating compound is retained in the microcapsule.

10. The process of claim 9 wherein the walls of the microcapsules are of a material selected from the group consisting of a dextrin derivative, a gelatin derivative, a homopolymer of an unsaturated hydrocarbon, copolymers of unsaturated hydrocarbons, and mixtures of two or more of these materials.

11. The process of claim 9 wherein said flame-abating compound is a halogenated paraffin of the formula:

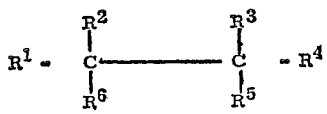

wherein $R^1$ through $R^6$ is each independently selected from the group consisting of H, Cl, Br, $CH_3$ and $C_2H_5$, with the first proviso that at least two of the R's are halogens selected from the group consisting of Cl and Br, and with the second proviso that the compound has a normal boiling point of over 100° C.

12. The process of claim 9 wherein the walls of said microcapsules are of carboxylated dextrin and said flame-abating compound is tris - (2,3 - dibromopropyl)-phosphate.

13. The process of claim 9 wherein the walls of said microcapsules comprise the polymeric reaction product of terephthaloyl chloride and 2,2 - bis - (4 - hydroxyphenyl)-propane.

14. The process of claim 9 wherein said flame-abating compound is 1,1,2,2-tetrabromoethane.

15. The process of claim 9 wherein a flame-abating compound is mixed with the polystyrene beads.

16. The process of claim 9 wherein a filler compound is mixed with the polystyrene beads.

(References on following page)

References Cited

UNITED STATES PATENTS

| | | | |
|---|---|---|---|
| 3,159,585 | 12/1964 | Evans et al. | 252—316 |
| 3,317,433 | 5/1967 | Eichel | 252—316 |
| 3,379,656 | 4/1968 | Eichorn | 252—8.1 X |
| 3,395,105 | 7/1968 | Washburn et al | 161—184 X |
| 3,429,827 | 2/1969 | Ruus | 252—316 |
| 3,441,524 | 4/1969 | Burger et al. | 260—2.5 |
| 3,445,404 | 5/1969 | Ronden et al. | 260—2.5 |
| 3,455,873 | 7/1969 | Jenkner | 260—2.5 |
| 3,470,116 | 9/1969 | Praetzel et al. | 260—2.5 |

JOHN T. GOOLKASIAN, Primary Examiner

D. J. FRITSCH, Assistant Examiner

U.S. Cl. X.R.

106—15 FP; 252—8.1; 260—2.5 AJ & B, 28.5 A, 45.7 R & P, DIGEST 24, 2.5 HB